United States Patent
Li et al.

(10) Patent No.: US 11,466,199 B1
(45) Date of Patent: Oct. 11, 2022

(54) SYNERGISTIC ENHANCEMENT OF SLICKWATER FRACTURING FLUIDS

(71) Applicant: Halliburton Energy Services, Inc., Houston, TX (US)

(72) Inventors: Leiming Li, Sugar Land, TX (US); Chunli Li, The Woodlands, TX (US); Liang Xu, Spring, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/239,077

(22) Filed: Apr. 23, 2021

(51) Int. Cl.
- *C09K 8/68* (2006.01)
- *C09K 8/80* (2006.01)
- *E21B 43/26* (2006.01)

(52) U.S. Cl.
CPC .............. *C09K 8/68* (2013.01); *C09K 8/80* (2013.01); *E21B 43/26* (2013.01); *C09K 2208/10* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 8,997,868 B2 | 4/2015 | Nguyen | |
| 9,556,376 B2 | 1/2017 | Huang | |
| 10,060,244 B2 | 8/2018 | Nguyen | |
| 2009/0318313 A1 | 12/2009 | Ali et al. | |
| 2014/0096964 A1* | 4/2014 | Chakraborty | B82Y 30/00 977/773 |
| 2014/0299326 A1 | 10/2014 | Crews | |
| 2014/0374095 A1* | 12/2014 | Ladva | C09K 8/92 166/280.2 |
| 2015/0252251 A1 | 9/2015 | Jiang et al. | |
| 2017/0037302 A1 | 2/2017 | Liang | |

(Continued)

FOREIGN PATENT DOCUMENTS

| | | |
|---|---|---|
| CN | 112375557 A | 2/2021 |
| WO | 2018013084 A1 | 1/2018 |

(Continued)

OTHER PUBLICATIONS

International Search Report and Written Opinion dated Jun. 22, 2022 for corresponding PCT application No. PCT/US2022/071106 filed on Mar. 11, 2022.

*Primary Examiner* — Andrew Sue-Ako
(74) *Attorney, Agent, or Firm* — K&L Gates LLP (57) ABSTRACT

A slickwater fracturing fluid that includes a brine with dissolved solids, an anionic friction reducing additive, a polysaccharide, and a nanomaterial that includes nanoparticles with an average particle size between about 1 nm and about 500 nm. The polysaccharide and the anionic friction reducing additive synergistically reduce friction of the slickwater fracturing fluid so as to increase an injection rate of the slickwater fracturing fluid. Also, the polysaccharide, the anionic friction reducing additive, and the nanomaterial synergistically provide viscosity to the slickwater fracturing fluid so as to increase proppant transport capability. Also described is a method of fracturing a subterranean formation by pumping the slickwater fracturing fluid into a borehole and fracturing the subterranean formation with the slickwater fracturing fluid.

15 Claims, 4 Drawing Sheets

(56) References Cited

U.S. PATENT DOCUMENTS

| | | |
|---|---|---|
| 2019/0112521 A1 | 4/2019 | McDaniel et al. |
| 2019/0161673 A1 | 5/2019 | McDaniel et al. |
| 2020/0123437 A1* | 4/2020 | Nguyen .................. C09K 8/80 |
| 2020/0392400 A1 | 12/2020 | Rahy et al. |
| 2021/0079291 A1* | 3/2021 | Li ........................... C09K 8/68 |
| 2021/0261855 A1* | 8/2021 | Xu ........................ C09K 8/602 |

FOREIGN PATENT DOCUMENTS

| | | | | |
|---|---|---|---|---|
| WO | 2018194663 A1 | 10/2018 | | |
| WO | WO 2020/081095 | * | 4/2020 | .............. C09K 8/68 |

* cited by examiner

SYNERGISTIC ENHANCEMENT OF SLICKWATER FRACTURING FLUIDS

BACKGROUND

This section is intended to provide relevant background information to facilitate a better understanding of the various aspects of the described embodiments. Accordingly, these statements are to be read in this light and not as admissions of prior art.

Slickwater fracturing is a method of stimulating tight shale or sand formations. In slickwater operations, water and a friction reducing additive (also referred to herein as a "friction reducing agent" or "friction reducer") are introduced into the formation at a high injection rate to fracture the formation. Because of the components, these slickwater fracturing fluids (also referred to herein as "slickwaters" or "slickwater fluids") typically use lower amounts of proppant and higher pumping rates than viscoelastic gels. The slickwaters are also able to produce complex networks of secondary fractures away from the primary fractures. Slickwaters are thus particularly useful in low-permeability gas formations where fracture width is less of a concern.

Friction reducers are used in slickwater fluids to reduce frictional losses, which are especially severe due to high injection rates. One example of a friction reducer is an anionic polyacrylamide friction reducer, where a portion of the amide groups stemming from the polymer backbone are hydrolyzed to carboxylic groups. The electrostatic repulsion between such negatively charged carboxylic groups increases the size of the polyacrylamide molecules and provides viscosity to the fracturing fluid. Long acrylamide polymer chains also reduce drag and thus pipe friction.

As fresh water for use in fracking fluids becomes increasingly scarce, slickwater fracturing fluids incorporate water that has been produced from wells with variable concentrations of total dissolved solids ("TDS") such as alkali metals, alkaline-earth metals, halogens, salts thereof, and other ionic species and impurities. However, such TDS are known to deteriorate the viscosity and friction reduction performance of slickwater fracturing fluids. For example, TDS can slow inversion of oil-based friction reducing additives and diminish their friction reduction performance. Cations from dissolved salts can interfere with the electrostatic repulsion between anionic chains, lowering the fluid viscosity. A need therefore exists for slickwater fracturing fluids that can tolerate high concentrations of TDS while maintaining viscosity and friction reduction performance properties.

BRIEF DESCRIPTION OF THE DRAWINGS

Embodiments of the slickwater fracturing fluids are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes the synergistic enhancement of viscosity and reduction of friction in slickwater fracturing fluids. The slickwater fracturing fluid includes a brine including dissolved solids. The slickwater fracturing fluid further includes an anionic friction reducing additive, a polysaccharide, and a nanomaterial. The polysaccharide and the anionic friction reducing additive synergistically reduce friction of the slickwater fracturing fluid so as to increase an injection rate of the slickwater fracturing fluid compared to an identical slickwater fracturing fluid absent the polysaccharide or the anionic friction reducing additive. Further, the polysaccharide, the anionic friction reducing additive, and the nanomaterial synergistically provide viscosity to the slickwater fracturing fluid so as to increase proppant transport capabilities compared to an identical slickwater fracturing fluid absent the polysaccharide, the anionic friction reducing additive, or the nanomaterial.

Further provided herein are methods of fracturing a subterranean formation. The methods include providing a slickwater fracturing fluid including a brine, an anionic friction reducing additive, a polysaccharide, and a nanomaterial. The methods further include reducing friction of the slickwater fracturing fluid synergistically with the polysaccharide and the anionic friction reducing additive so as to increase an injection rate of the slickwater fracturing fluid compared to an identical slickwater fracturing fluid absent the polysaccharide or the anionic friction reducing additive. Further, the polysaccharide, the anionic friction reducing additive, and the nanomaterial synergistically provide viscosity so as to increase proppant transport capability compared to an identical slickwater fracturing fluid absent the polysaccharide, the anionic friction reducing additive, or the nanomaterial. The methods further include pumping the slickwater fracturing fluid into the subterranean formation to fracture the formation.

Components that are described herein as "synergistically" enhancing a property or increasing a value are components that in combination enhance the property or increase the value more than if the components were utilized individually. Similarly, "synergy" refers to such synergistic enhancement.

The term "mesh" indicates a particle size distribution of a material containing particles. The mesh number equals the number of openings in one square inch of a screen through which particles can pass. Thus, higher mesh numbers correspond to smaller allowed particle sizes. The particle size distribution is expressed as a ratio, wherein the ratio indicates a lowerbound and upperbound mesh. For example, a sand described as "20/40 mesh" indicates at least 90% of the sand particles are between 20 mesh and 40 mesh. Conversion from a mesh number to particle size is standardized in ASTM E11.

The term "viscosity" refers to dynamic viscosity, a measure of a fluid's resistance to flow. Viscosity is expressed in units of centipoise (cP), equivalent to milliPascal-seconds (mPA·s), and is measured according to American Petroleum Institute Recommended Practice 13B-2.

The term "friction reduction" refers to reduction of friction between a fluid and the fluid-contacting surface of a pipe through which the fluid is flowing, and is expressed as a percent. The percent friction reduction is a comparison between the fluid before and after addition of friction reducing components. Friction reduction can be measured, for example, using a friction loop with a 0.5 inch-diameter smooth pipe at a fluid injection rate of 10 gpm at room temperature (about 22° C.).

The term "initial friction reduction," or the term "initial" when used in the context of friction reduction, refers to friction reduction immediately after addition of a friction reducer to a fluid, but before complete inversion, hydration, and dispersal of the friction reducer. During this time, friction reduction varies significantly as the friction reducer disperses within the fluid and begins to reduce drag.

The term "polymer hydration" refers to hydration of polymers of the friction reducer. Oil-based emulsified friction reducers must be inverted and then wetted or hydrated by a water-based fluid to disperse and reduce friction of the fluid. The speed of inversion and polymer hydration affect the performance of the friction reducer. The time for friction reduction performance to stabilize, or the period of initial friction reduction, can be used as a measure of the speed of polymer hydration.

Assuming the density of water to be approximately 1 g/mL, then 1 part contaminant per million parts of water (1 ppm) equals 1 mg contaminant per liter of water (1 mg/L). Thus, TDS concentrations listed in ppm can interchangeably be described in units of mg/L, and vice versa.

Where ranges of numerical values are provided, it is to be understood that such ranges are not limited solely to those expressly disclosed. Rather, combinations of ranges are also implicitly disclosed. For example, upper or lower endpoints of one closed range can be combined with upper or lower endpoints of another closed range, or can be used as the boundary of an open-ended range. Upper or lower endpoints of open-ended ranges can similarly be combined to form closed ranges, or their range inverted to describe an opposite open-ended range.

Slickwater Components and Benefits

As mentioned above, the slickwater fracturing fluid includes a water-based carrier fluid. The carrier fluid can include energized or non-energized water, brine, produced water, fresh water, gels, cross-linked fluids, mineral or organic acids, non-aqueous base fluids, or any other type of fluids capable of carrying solids down into the formation and fracturing the formation.

To reduce the use of scarce fresh water, the carrier fluid can include brines produced from wells containing dissolved solids. The brine can include reformulated water, reconstituted water, reused water, treated water, produced water, or the like, or combinations thereof. The brine can have a TDS (total dissolved solids) concentration between about 0 and about 500,000 mg/L, between about 1,000 mg/L and about 500,000 mg/L, between about 2,000 mg/L and about 500,000 mg/L, between about 3,000 mg/L and about 500,000 mg/L, between about 4,000 mg/L and about 500,000 mg/L, between about 5,000 mg/L and about 500,000 mg/L, between about 6,000 mg/L and about 500,000 mg/L, between about 7,000 mg/L and about 500,000 mg/L, between about 8,000 mg/L and about 500,000 mg/L, between about 9,000 mg/L and about 500,000 mg/L, between about 9,200 mg/L and about 500,000 mg/L, less than about 500,000 mg/L, less than about 400,000 mg/L, less than about 300,000 mg/L, less than about 200,000 mg/L or less than about 100,000 mg/L, as measured according to ASTM D5907. Such TDS include salts, solids, and dissolved ions of barium, calcium, iron, magnesium, potassium, sodium, strontium, bicarbonate, carbonate, chloride, sulfate, the like, and combinations thereof.

The slickwater fracturing fluid also includes components to counteract deterioration of fracturing performance due to TDS. For example, the slickwater fracturing fluid also includes an anionic friction reducing additive, such as an anionic polyacrylamide, to increase viscosity and reduce friction. Anionic friction reducing additives, particularly polyacrylamides, with long, flexible polymer chains reduce drag and thus friction in slickwater fracturing fluids. Further, as discussed in more detail below, the anionic friction reducing additive further reduces friction and increases viscosity synergistically in combination with other components of the slickwater fracturing fluid. The synergistic benefits are achieved when including the anionic friction reducing additive at a concentration between about 0.1 and about 10 gpt (gallons per thousand gallons of slickwater fracturing fluid), or between about 2 and about 8 gpt, or about 8 gpt.

The slickwater fracturing fluid also includes a polysaccharide to synergistically reduce friction with the anionic friction reducing additive and increase viscosity in combination with the anionic friction reducing additive and a nanomaterial as discussed below. Such viscosity and friction reduction benefits are achieved when including the polysaccharide at a concentration less than about 40 ppt, or between about 0.1 and about 40 ppt (pounds polysaccharide per 1000 gallons of slickwater fracturing fluid), or between about 10 and about 30 ppt, or about 20 ppt. The polysaccharide is included in concentrations high enough to provide the aforementioned benefits, but low enough to prevent formation of a linear or crosslinked gel. Polysaccharides such as guar are known gelling agents in viscoelastic gels. Despite inclusion of the polysaccharide, the slickwater fracturing fluid remains fluidic without formation of a linear or crosslinked gel, and does not include additional gelling or crosslinking agents.

The polysaccharide can be selected from the group consisting of guar, guar gum, carboxymethylguar, hydroxyethylguar, carboxymethylhydroxyethylguar, hydroxypropylguar, carboxymethylhydroxypropylguar, hydroxyethylcellulose, hydroxypropylcellulose, carboxymethylhydroxyethylcellulose, xanthan, scleroglucan, succinoglycan, diutan, and combinations thereof. Guar, for example, includes branched galactomannan polymers whose chains include two units of mannose per unit of galactose. Where the polysaccharide comprises guar, guar is preferably included at a concentration between about 15 and about 25 ppt.

As mentioned above, pipe friction of the slickwater fracturing fluid is synergistically reduced by the polysaccharide and the anionic friction reducing additive compared to an identical slickwater fracturing fluid absent any one of such components. The synergy results from chain entanglements and intermolecular attractions such as hydrogen bonding between the polymer chains of the polysaccharide and the anionic friction reducing additive, which form a three-dimensional polymer network. The stable polymer network increases the fluid viscosity and may further increase drag reduction provided by the polymer chains therein. The ionic interferences of TDS are thus diminished, speeding inversion and hydration of the anionic friction reducing additive. The synergy thus provides the slickwater fracturing fluid with faster initial friction reduction and more effective friction reduction overall compared to an identical slickwater fracturing fluid absent any one of such components.

The slickwater fracturing fluid also includes a nanomaterial that synergistically increases viscosity in combination with the anionic friction reducer and the polysaccharide while maintaining friction reduction performance. The nanomaterial provides such benefits when included in the slickwater fracturing fluid at a concentration between about 0.1 and about 20 ppt, such as between about 1 and about 15 ppt, between about 2 and about 8 ppt, or at about 4 ppt. The nanomaterial includes particles having an average particle size between about 1 and about 500 nanometers, or between about 5 and about 100 nm, or between about 10 and about 50 nm, as measured according to ASTM E2859. The nanomaterial can be selected from the group consisting of silica, graphene, aluminum, iron, zirconium, titanium, silicon, metal oxides, hydroxides, and combinations thereof. The nanomaterial can include metal oxides such as zirconium oxide, titanium oxide, and silicon oxide.

The viscosity of the slickwater fracturing fluid is synergistically enhanced by the polysaccharide, the anionic friction reducing additive, and the nanomaterial compared to an identical slickwater fracturing fluid absent any one of such components. The synergy results from intermolecular attractions between (1) the nanoparticles and (2) polymers of the polysaccharide and the anionic friction reducing additive provide viscosity to the slickwater fracturing fluid. The rigidity and stability of the polymer network formed by the polysaccharide and the anionic friction reducing additive enhances the viscosity of the slickwater fracturing fluid. The nanoparticles additionally strengthen the network by forming hydrogen bonds with the polymers, forming a three-dimensional nanoparticle-polymer network to further increase fluid viscosity. Such hydrogen bonds readily form in static and low shear conditions, but readily break when high shear is applied. The intermolecular attractions counteract the destabilization caused by excessive TDS and thus counteract the reduction of viscosity caused by excessive TDS.

Fracturing performance of the slickwater fracturing fluid is thus improved compared to an identical slickwater fracturing fluid absent the polysaccharide, the anionic friction reducing additive, or the nanomaterial, the improvement due to the synergistic viscosity enhancement and friction reduction. First, pipe friction as the slickwater fracturing fluid flows downhole is reduced due to the synergistically enhanced performance of the friction reducing additive. Second, initial friction reduction performance is enhanced by increasing the speed of inversion, hydration, and dispersion of the anionic friction reducer. Third, proppant transport capabilities are improved due to the synergistically enhanced viscosity. The enhanced viscosity and friction reduction performance allow for higher fluid viscosity, larger volumes of produced water, improved TDS tolerance, higher injection rates, and higher surface pump pressures during fracturing and other stimulation treatments. For example, friction of the slickwater fracturing fluid is synergistically reduced up to about 80%, or up to about 70%, or up to about 60%, or up to about 50%, or up to about 40%, or up to about 30%, or up to about 20%, as measured by a friction loop with a 0.5 inch-diameter smooth pipe, at a fluid injection rate of 10 gpm, at room temperature (about 22° C.), with two pressure gauges located 2 ft apart measuring friction pressure about once per second. Comparable friction reducers include the Model 6500 Friction Flow Loop available from Strata Technology, or the Friction Flow Loop, FFL-200, available from Core Laboratories™. Viscosity is synergistically provided to the slickwater fracturing fluid up to about 150 cP, or up to about 100 cP, or up to about 50 cP, or up to about 45 cP, or up to about 42 cP, or up to about 40 cP, or up to about 35 cP, or up to about 30 cP, or up to about 25 cP, as measured according to American Petroleum Institute Recommended Practice 13B-2.

The slickwater fracturing fluid may also optionally include a proppant to prop open fractures. The proppant includes particles composed of sand, ceramic material, plastics, and resins, or other conductivity enhancement materials. In use, the proppant is suspended in the carrier fluid and settles into the high flow capacity fractures and low flow capacity fractures to hold the fractures open so as to permit the flow of hydrocarbons from the reservoir and into the borehole. The concentration of proppant in the slickwater fracturing fluid may be varied throughout a stimulation treatment such as hydraulic fracturing. For example, at a specified time during the fracturing, the proppant may have a concentration in the slickwater fracturing fluid between about 0 and about 5 ppg (pounds proppant per gallon of slickwater fracturing fluid), between about 0 and about 4 ppg, or between about 1 and about 4 ppg, as measured by a radioactive densometer, calculation via mass and volumetric flow balancing, or other suitable methods known in the art for determining concentration of a proppant in a fracturing fluid.

Proppant, such as sand, may include a distribution of particle sizes. Proppant particle distributions are typically indicated by a lower and upperbound mesh size, for example 20/40 mesh sand. Proppant suitable for use in the slickwater fracturing fluid include proppants with average mesh sizes greater than about 20, such as 20/40 mesh sand, 30/70 mesh sand, 40/70 mesh sand, and 70/140 mesh sand. A mesh size of 20 corresponds to an average particle size of about 850 microns, whereas 100 mesh corresponds to an average particle size of about 150 microns.

The proppant may further comprise a micro-proppant having particle sizes less than 100 microns, or less than 50 microns, or less than 10 microns, as measured by ASTM D6913 or ASTM D1140, to further increase fluid viscosity compared to an identical slickwater fracturing fluid absent such micro-proppant. Micro-proppants such as hydrophilic sand can attract hydrophilic polymers of the polysaccharide and friction reducer to further stabilize the nanoparticle-polymer network. The micro-proppant thus increases viscosity in a manner similar to the nanomaterial. However, the viscosity increases are minor in comparison to those provided by the nanomaterial. At decreasing particle sizes of micro-proppant, i.e. as the micro-proppant approaches the size of a nanoparticle, the intermolecular attractions will strengthen and further increase viscosity. Micro-proppant can be mixed with the slickwater fracturing fluid at concentrations ranging from about 0 to about 1 ppg during the pumping or injecting, from about 0 to about 0.5 ppg, or from about 0 to about 0.1 ppg, as measured by a radioactive densometer, calculation via mass and volumetric flow balancing, or other suitable methods known in the art for determining concentration of a proppant in a fracturing fluid.

In addition to the components described above, the slickwater fracturing fluid may also optionally include additives to optimize properties of the slickwater fracturing fluid for the fracturing treatment. Such additives include, but are not limited to, stabilizers, surfactants, fluid loss additives, friction reducers, emulsifiers, scale inhibitors, biocides, and pH control additives, combinations thereof, and the like. The additives and their quantities are selected based on the properties of the subterranean formation, the specific components of the slickwater fracturing fluid, and the specific slickwater fracturing treatment envisioned.

Method of Fracturing a Subterranean Formation

The slickwater fracturing fluid is used in fracturing a subterranean formation in order to produce natural resources from the formation. To do so, the slickwater fracturing fluid including the carrier fluid, the anionic friction reducing additive, the polysaccharide, and the nanomaterial are pumped into a borehole. As described above, the polysaccharide and the anionic friction reducing additive synergistically reduce the friction of the slickwater fracturing fluid so as to increase an injection rate of the slickwater fracturing fluid compared to an identical slickwater fracturing fluid absent the polysaccharide and the anionic friction reducing additive. Further, the polysaccharide, the anionic friction reducing additive, and the nanomaterial synergistically provide increased viscosity to the slickwater fracturing fluid compared to an identical slickwater fracturing fluid absent the polysaccharide, the anionic friction reducing additive, and the nanomaterial via intermolecular attractions between the nanoparticles and polymers of the polysaccharide and the anionic friction reducing additive. The pumping of the slickwater fracturing fluid continues with enough pressure to fracture the subterranean formation.

The amount and rate of water injected during a fracturing treatment, as well as the surface pump pressure and downhole pressure, may be constrained by pipe friction. When injected into a tubular pipe extending into the borehole, friction between the pipe and slickwater fracturing fluid causes loss of fluid pressure as the fluid travels. By reducing these frictional losses with the slickwater fracturing fluid, additional water can be injected to more effectively fracture the formation compared to an identical slickwater fracturing fluid absent any one of the synergistic components. The pumping or injection of the slickwater fracturing fluid downhole may be performed at rates exceeding 60 bbl/min, or exceeding 100 bbl/min, or exceeding 120 bbl/min, or less than about 150 bbl/min, or between about 60 and about 150 bbl/min, as measured by a flowmeter. Additionally, fresh water and produced water can be mixed at the surface to prepare additional water for the slickwater fracturing fluid without further increasing TDS concentration.

If a proppant is used, the proppant is mixed with the slickwater fracturing fluid before or during the pumping or injecting in one or more pad stages. For example, the slickwater fracturing can initially be free of proppant, and the concentration of proppant increased as the pumping or injecting continues.

The fracturing performance of the slickwater fracturing fluid is improved compared to an identical slickwater fracturing fluid absent the polysaccharide, the anionic friction reducing additive, and the nanomaterial. For example, the slickwater fracturing fluid allows for increased injection rates of carrier fluid, increased volumes of brine, increased proppant transport capability, and lower surface pumping pressures in stimulation treatments such as hydraulic fracturing, gravel packing, and frac-packing. Reduction of pipe friction benefits surface pumps and fracturing performance, allowing for higher pump pressure, downhole pressure, and injection rate. Tolerance of TDS without loss of performance allows for inclusion of additional brine, such as produced water containing dissolved solids. Further, the use of the anionic friction reducing additive, the polysaccharide, and the nanomaterial to synergistically increase viscosity improves the proppant transport capabilities of the slickwater fracturing fluid compared to an identical slickwater fracturing fluid absent the components imparting viscosity synergy. High-viscosity fluids are known to carry and transport solids more effectively than low-viscosity fluids. The synergistically increased viscosity thus improves the proppant transport capabilities of the slickwater fracturing fluid. For example, the slickwater fracturing fluid may have a proppant carrying capacity of about 0.25 to about 5 ppg, about 0.25 to about 4 ppg, or about 0.25 to about 3 ppg, as measured by a radioactive densometer, calculation via mass and volumetric flow balancing, or other suitable methods known in the art for determining concentration of a proppant in a fracturing fluid.

Embodiment

Figure 1:
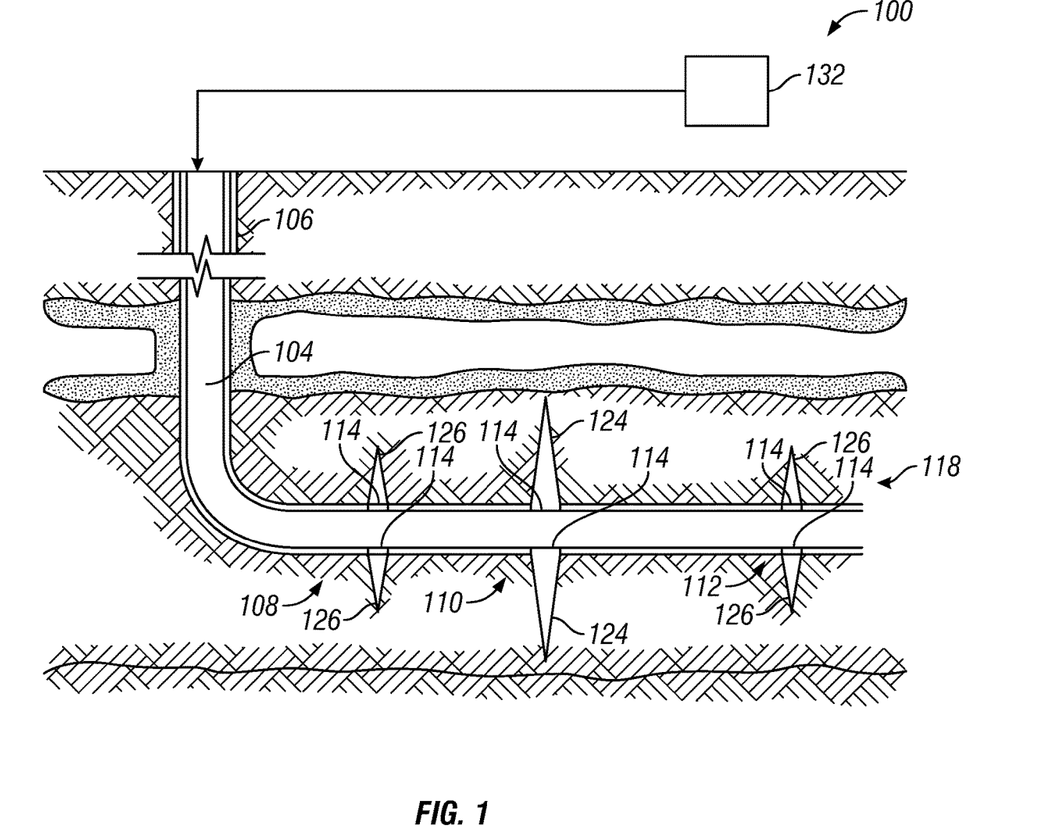
FIG. 1 is a schematic diagram of a fracturing operation.

Turning now to the figures, FIG. 1 is a schematic diagram of a fracturing operation performed on a subterranean formation 100. The subterranean formation 100 includes porous and permeable rocks that contain hydrocarbons. The subterranean formation 100 can be located in an onshore or offshore environment. The subterranean formation 100 can be located a few hundred feet to a few tens of thousands of feet below the ground surface. A borehole 104 is drilled to penetrate the subterranean formation 100 and allow production of hydrocarbons. The borehole 104 of FIG. 1 can be formed at any suitable angle to reach the hydrocarbon portion of the subterranean formation 100. For example, the borehole 104 can follow a near-vertical, partially-vertical, angled, or even a partially-horizontal path through the subterranean formation 100. The borehole 104 may be lined with a protective lining 106 that can include a casing, liner, piping, or tubing and can be made of any material, including steel, alloys, or polymers, among others. The protective lining 106 extends vertically downward and continues horizontally to further extend through the subterranean formation 100. The borehole 104 can also be completely or partially lined or fully openhole (without the protective lining 106).

Hydrocarbons are located in the pore volume space of the subterranean formation 100 and may be produced when the pore spaces are connected and permeability is such that the hydrocarbons flow into the borehole 104. In some cases, the subterranean formation 100 may have low permeability, and the hydrocarbons do not readily flow or production is hampered due to formation damage. Thus, to further stimulate and to extract the hydrocarbons, a stimulation treatment is initiated to break, fracture, or induce dilation of existing natural fractures in the rock of the subterranean formation 100. The stimulation treatment can include perforating the protective lining 106, or installing stimulation-specific protective lining equipment, to create formation entry points 114, e.g., perforations, sliding stimulation sleeves, etc. The formation entry points 114 provide a pathway for the hydrocarbons to flow out of the subterranean formation 100 and into the borehole 104. The stimulation treatment can further include but is not limited to hydraulic fracturing, gravel packing, and frac-packing (i.e. the combination of hydraulic fracturing and gravel packing).

Mechanical isolation and compartmentalization tools can be used to segment the subterranean formation 100 into any number of production zones where fracturing treatments can be carried out. As shown in FIG. 1, the formation 100 includes a first production zone 108, a second production zone 110, and a third production zone 112. Each zone 108, 110, 112 can be stimulated individually or simultaneously with other zones depending on the mechanical isolation and compartmentalization system employed. It should be understood that the number of zones in FIG. 1 is one example and that a wide variety of other examples are possible, including increasing or decreasing the number of zones in the subterranean formation 100.

The fracturing operation includes injecting pressurized slickwater fracturing fluid as described above into the borehole 104 to stimulate one or more of the production zones 108, 110, 112. The slickwater fracturing fluid can initially be stored in injection equipment 132, such as a storage tank or pipeline. The slickwater fracturing fluid is then pumped from the injection equipment 132 and into the borehole 104 with pressure greater than the fracture gradient or fissure opening pressure of the subterranean formation 100 to fracture the subterranean formation 100. Other suitable equipment than shown can also be used to flow the slickwater fracturing fluid into the borehole 104, for example, via a conduit, such as coiled tubing or piping, located within the borehole 104. As the slickwater fracturing fluid flows through the formation entry points 114, the increased pressure created by the flowing slickwater fracturing fluid cracks the formation 100 to create or further widen a network of fractures 118. The network of fractures 118 of FIG. 1 may include high flow capacity fractures 124 and low flow capacity fractures 126.

The polysaccharide and the anionic friction reducing additive synergistically reduce the friction of the slickwater fracturing fluid so as to increase an injection rate of the slickwater fracturing fluid compared to an identical slickwater fracturing fluid absent the polysaccharide and the anionic friction reducing additive. Further, the polysaccharide, the anionic friction reducing additive, and the nanomaterial synergistically provide increased viscosity to the slickwater fracturing fluid compared to an identical slickwater fracturing fluid absent the polysaccharide, the anionic friction reducing additive, and the nanomaterial.

The illustrative subterranean formation 100 of FIG. 1 is merely exemplary in nature and various additional components may be present that have not necessarily been illustrated in the interest of clarity. For example, additional components that may be present include, but are not limited to, pumps, monitoring units, injection equipment, sensors, and other well completion and production equipment.

EXAMPLES

In Examples I-III, fluids were prepared using samples of a reconstituted produced water from a YPF™ well in Argentina. Table 1 shows concentrations of several dissolved solids in the reconstituted produced water. The produced water had a TDS over 9,200 mg/L and a pH of about 7.7 at room temperature (about 22° C.).

TABLE 1

Concentrations of dissolved solids in produced water

| Dissolved Solid | Concentration |
| --- | --- |
| Barium | 0 mg/L |
| Calcium | 30 mg/L |
| Iron | 1 mg/L |
| Magnesium | 20 mg/L |
| Potassium | 0 mg/L |
| Sodium | 3520 mg/L |
| Strontium | 0 mg/L |
| Bicarbonate | 340 mg/L |
| Carbonate | 20 mg/L |
| Chloride | 4930 mg/L |
| Sulfate | 380 mg/L |

Example I—Enhancement of Viscosity with Polysaccharide

In Examples I and II, fluid viscosities were measured with a Fann™ Model 35 Viscometer equipped with an R1 Rotor Sleeve, B1 Bob, and F1 Torsion Spring at 300 rpm (or 511 $s^{-1}$ shear rate).

Figure 2:
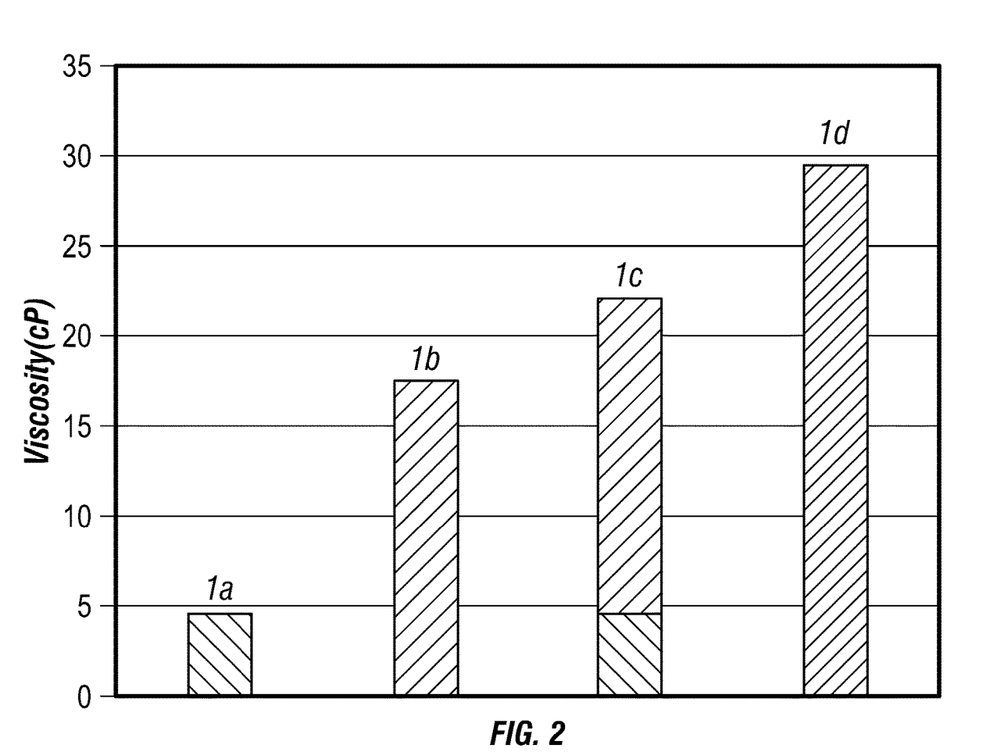
FIG. 2 is a graph showing viscosities of several fluids prepared from produced water with addition of guar and polyacrylamide.

A first fluid was prepared with the produced water and EC-1, an anionic polyacrylamide friction reducer. The friction reducer was included at a concentration of 8 gallons EC-1 per thousand gallons of the produced water, or 8 gpt EC-1. The viscosity of the first fluid was measured to be 4.5 cP, as shown in FIG. 2, column 1a.

A second fluid was prepared with the produced water and 5 gpt of a guar slurry (containing 20 ppt net guar). The viscosity of the second fluid was measured to be 17.5 cP, as shown in FIG. 2, column 1b. Column 1c was generated by summing 1a (4.5 cP) and 1b (17.5 cP), which summed to 22.0 cP.

A third fluid was prepared with the produced water, 8 gpt EC-1, and 5 gpt of the guar slurry. The third fluid viscosity was measured to be 29.5 cP, as shown in column 1d. The viscosity of the third fluid was about 34% greater than 22.0 cP (column 1c, the summation of 1a and 1b), demonstrating that the guar and the polyacrylamide in combination increased the viscosity of the produced water by a greater amount than would be expected from their individual contributions. This indicates existence of a synergy between the guar and the polyacrylamide with regard to increasing viscosity of the fluid.

Example II—Enhancement of Viscosity with Nanomaterial

Figure 3:
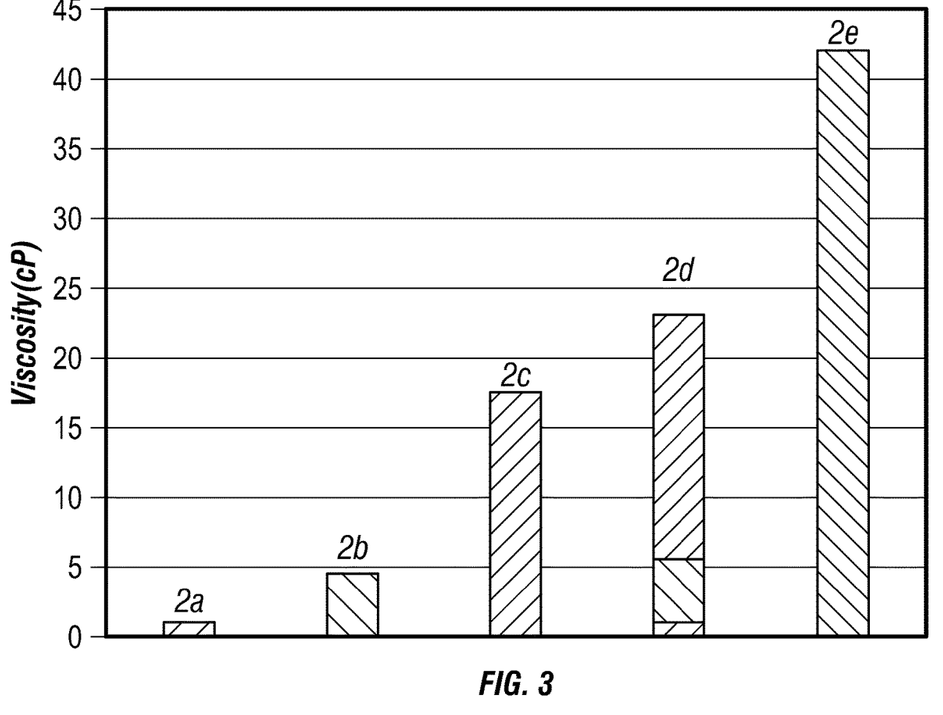
FIG. 3 is a graph showing viscosities of several fluids prepared from produced water with addition of guar, polyacrylamide, and $ZrO_2$ nanoparticles.

In this Example, a first fluid was prepared with the produced water and 4 ppt of zirconium oxide ($ZrO_2$) nanoparticles with an average particle size of 15-25 nm from Alfa Aesar™, product #44886. The fluid viscosity was measured to be 1.0 cP, as shown in FIG. 3, column 2a.

A second fluid was prepared with the produced water and 8 gpt EC-1. The fluid viscosity was measured to be 4.5 cP, as shown in FIG. 3, column 2b.

A third fluid was prepared with the produced water and 5 gpt of the guar slurry (containing 20 ppt of net guar). The fluid viscosity was measured to be 17.5 cP, as shown in FIG. 3, column 2c. Column 2d was the direct addition of 2a, 2b and 2c, or 23.0 cP.

A fourth fluid was prepared with the produced water, 8 gpt EC-1, 5 gpt of the guar slurry, and 4 ppt of the $ZrO_2$ nanoparticles. The fluid viscosity was measured to be 42.0 cP, as shown in FIG. 3, column 2e. The viscosity of the fourth fluid was about 83% greater than that of column 2d (the direct addition of 2a, 2b, and 2c), suggesting that there existed a strong synergy between the guar, the polyacrylamide, and the nanoparticles with regard to increasing viscosity of the fluid.

It is suspected that polymer chains of the EC-1 attached to the surfaces of $ZrO_2$ nanoparticles. In this way the 3D network of polymers in the fluid were strengthened, as reflected by the viscosity increase shown in FIG. 3. Other nanoparticles of metal oxides like $TiO_2$, $SiO_2$, etc., should interact similarly. Furthermore, micro-proppant including sand with particle sizes below 10 microns should interact similarly. With a slightly larger size than nanoparticles, hydrophilic sand can similarly attract anionic polyacrylamide molecules to bind with the sand and increase fluid viscosity.

The fluid viscosity of the fourth fluid (42.0 cP) was about 9.3 times greater than that of the second fluid (4.5 cP) comprising produced water and EC-1. This example demonstrates that addition of a polysaccharide and a nanomaterial can result in fluid viscosity exceeding that of a slickwater fracturing fluid without such components. However, such enhanced viscosity is not necessarily limited to the values provided in this example. For example, viscosity can be synergistically provided to the slickwater fracturing fluid up to about 150 cP, or up to about 100 cP, or up to about 50 cP, or up to about 45 cP, or up to about 42 cP, or up to about 40 cP, or up to about 35 cP, or up to about 30 cP, or up to about 25 cP, as measured according to American Petroleum Institute Recommended Practice 13B-2.

Example III—Enhancement of Friction Reduction with Polysaccharide and Nanomaterial In this Example, friction loop tests were conducted using a Halliburton™-built friction loop instrument utilizing a 0.5 inch-diameter smooth pipe at an injection rate of 10 gpm to determine the friction reduction performance at room temperature (about 22° C.). The friction loop records a friction pressure differential by measuring friction pressure as a fluid flows past each of two pressure gauges located 2 ft apart. The pressure gauges measure friction pressure approximately once per second. Comparable friction reducers are commercially available, such as the Model 6500 Friction Flow Loop available from Strata Technology, or the Friction Flow Loop, FFL-200, available from Core Laboratories™.

Figure 4:
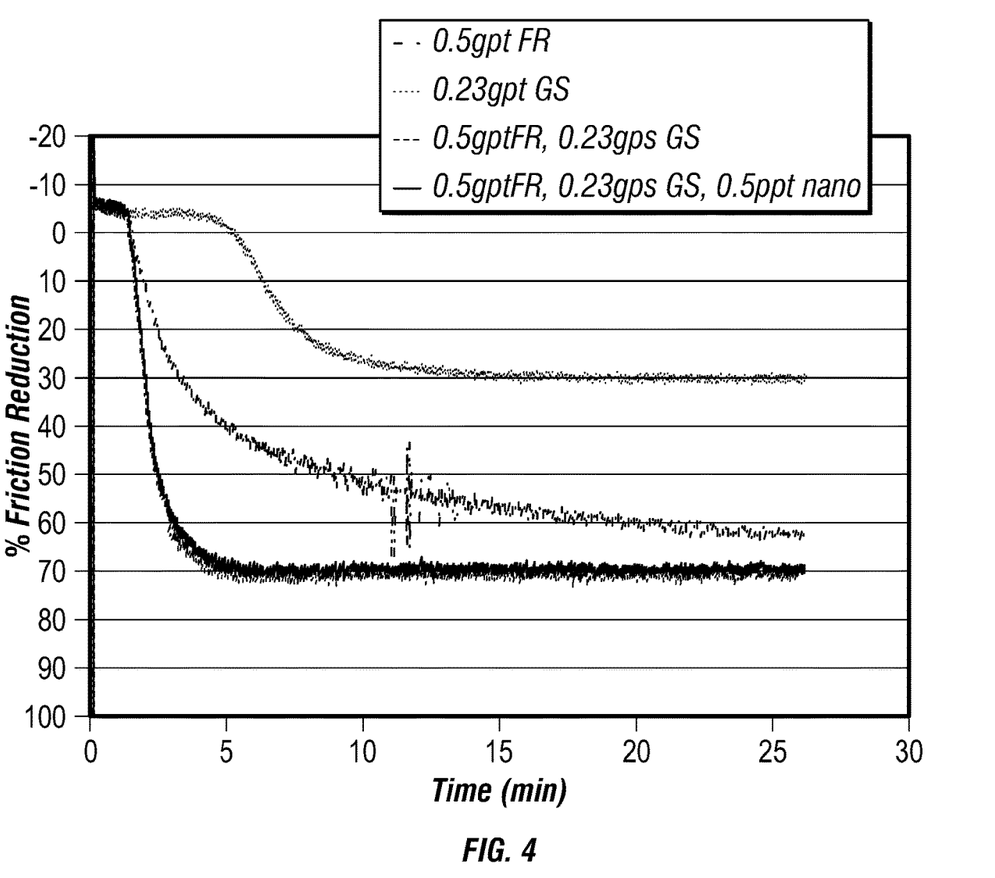
FIG. 4 is a graph showing friction reduction performance over time of several fluids prepared from produced water with addition of guar, polyacrylamide, and $ZrO_2$ nanoparticles.

As shown in FIG. 4, a first friction loop test was carried out for 0.5 gpt EC-1 in the produced water. A second friction loop test was carried out for 0.23 gpt of the guar slurry (containing about 0.92 ppt of guar) in the produced water. A third friction loop test was carried out for the combination of 0.5 gpt EC-1 and 0.23 gpt of the guar slurry in the produced water. Compared with either the EC-1 or guar slurry alone, the fluid with the combination of EC-1 and guar slurry showed significantly larger friction reduction values and much faster polymer hydration.

A fourth friction loop test was carried out for the combination of 0.5 gpt EC-1, 0.23 gpt of the guar slurry, and 0.5 ppt of the $ZrO_2$ nanoparticles in the produced water, as shown in FIG. 4. This curve almost overlaps with the curve representing the combination of EC-1 and guar slurry, suggesting that the addition of the nanoparticles did not adversely affect the friction reduction performance. With or without the nanoparticles, friction reduction up to about 70% was achieved as shown in FIG. 4.

Examples of the above embodiments include:

Example 1 is a slickwater fracturing fluid comprising a brine comprising dissolved solids, an anionic friction reducing additive, a polysaccharide, and a nanomaterial comprising nanoparticles with an average particle size between about 1 nm and about 500 nm, wherein the polysaccharide and the anionic friction reducing additive synergistically reduce friction of the slickwater fracturing fluid so as to increase an injection rate of the slickwater fracturing fluid, and wherein the polysaccharide, the anionic friction reducing additive, and the nanomaterial synergistically provide viscosity to the slickwater fracturing fluid so as to increase proppant transport capability.

In Example 2, the embodiments of any preceding paragraph or combination thereof further include the slickwater fracturing fluid of Example 1, wherein the brine comprises reconstituted produced water.

In Example 3, the embodiments of any preceding paragraph or combination thereof further include the slickwater fracturing fluid of Example 1, wherein the dissolved solids are dissolved in the slickwater fracturing fluid at a concentration between about 9,200 mg/L and about 500,000 mg/L and comprise ions selected from the group consisting of barium, calcium, iron, magnesium, potassium, sodium, strontium, bicarbonate, carbonate, chloride, sulfate, and combinations thereof.

In Example 4, the embodiments of any preceding paragraph or combination thereof further include the slickwater fracturing fluid of Example 1, wherein the anionic friction reducing additive is an anionic polyacrylamide friction reducing additive.

In Example 5, the embodiments of any preceding paragraph or combination thereof further include the slickwater fracturing fluid of Example 1, wherein the polysaccharide is selected from the group consisting of guar gum, carboxymethylguar, hydroxyethylguar, carboxymethylhydroxyethylguar, hydroxypropylguar, carboxymethylhydroxypropylguar, hydroxyethylcellulose, hydroxypropylcellulose, carboxymethylhydroxyethylcellulose, xanthan, scleroglucan, succinoglycan, diutan, and combinations thereof.

In Example 6, the embodiments of any preceding paragraph or combination thereof further include the slickwater fracturing fluid of Example 1, wherein the nanomaterial is selected from the group consisting of $ZrO_2$, $TiO_2$, $SiO_2$, and combinations thereof.

In Example 7, the embodiments of any preceding paragraph or combination thereof further include the slickwater fracturing fluid of Example 1, further comprising fresh water.

In Example 8, the embodiments of any preceding paragraph or combination thereof further include the slickwater fracturing fluid of Example 1, wherein the anionic friction reducing additive and the polysaccharide synergistically invert and hydrate the anionic friction reducing additive to enhance initial friction reduction performance.

In Example 9, the embodiments of any preceding paragraph or combination thereof further include the slickwater fracturing fluid of Example 1, wherein the slickwater fracturing fluid comprises the nanomaterial in an amount between about 0.1 ppt and about 20 ppt.

In Example 10, the embodiments of any preceding paragraph or combination thereof further include the slickwater fracturing fluid of Example 1, wherein the polysaccharide and the anionic friction reducing additive synergistically reduce friction of the slickwater fracturing fluid up to about 70%.

In Example 11, the embodiments of any preceding paragraph or combination thereof further include the slickwater fracturing fluid of Example 1, wherein the polysaccharide, the anionic friction reducing additive, and the nanomaterial synergistically provide viscosity to the slickwater fracturing fluid up to about 42 cP.

In Example 12, the embodiments of any preceding paragraph or combination thereof further include the slickwater fracturing fluid of Example 1, wherein the polysaccharide, the anionic friction reducing additive, and the nanomaterial synergistically provide viscosity to the slickwater fracturing fluid via intermolecular attractions between the nanoparticles and polymers of the polysaccharide and the anionic friction reducing additive.

In Example 13, the embodiments of any preceding paragraph or combination thereof further include the slickwater fracturing fluid of Example 1, wherein the slickwater fracturing fluid further comprises a micro-proppant with an average particle size less than about 10 microns to further synergistically increase viscosity of the slickwater fracturing fluid.

In Example 14, the embodiments of any preceding paragraph or combination thereof further include the slickwater fracturing fluid of Example 1, wherein the nanomaterial synergistically increases viscosity of the slickwater fracturing fluid while maintaining friction reduction performance.

In Example 15, the embodiments of any preceding paragraph or combination thereof further include the slickwater fracturing fluid of Example 1, wherein the slickwater fracturing fluid comprises the anionic friction reducing additive in an amount between about 0.1 and about 10 gpt.

Example 16 is a method of fracturing a subterranean formation comprising pumping a slickwater fracturing fluid into a borehole, the slickwater fracturing fluid comprising a brine comprising dissolved solids, reducing friction of the slickwater fracturing fluid synergistically with a polysaccharide and an anionic friction reducing additive so as to increase an injection rate of the slickwater fracturing fluid, providing viscosity to the slickwater fracturing fluid synergistically with the polysaccharide, the anionic friction reducing additive, and a nanomaterial comprising nanoparticles with an average particle size between about 1 and about 500 nm via intermolecular attractions between the nanoparticles and polymers of the polysaccharide and the anionic friction reducing additive, and fracturing the subterranean formation with the slickwater fracturing fluid.

In Example 17, the embodiments of any preceding paragraph or combination thereof further include the method of Example 16, wherein the pumping is performed at a rate between about 60 and about 150 bbl/min.

In Example 18, the embodiments of any preceding paragraph or combination thereof further include the method of Example 16, comprising enhancing initial friction reduction performance of the slickwater fracturing fluid synergistically with the anionic friction reducing additive and the polysaccharide.

In Example 19, the embodiments of any preceding paragraph or combination thereof further include the method of Example 16, wherein the method further comprises mixing a micro-proppant with the slickwater fracturing fluid before or during the pumping to further synergistically increase viscosity of the slickwater fracturing fluid, the micro-proppant comprising particles with an average particle size less than about 10 microns.

In Example 20, the embodiments of any preceding paragraph or combination thereof further include the method of Example 16, further comprising mixing the brine with fresh water before or during the pumping.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While compositions and methods are described herein in terms of "comprising" various components or steps, the compositions and methods can also "consist essentially of" or "consist of" the various components and steps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A slickwater fracturing fluid comprising:
a brine comprising dissolved solids;
an anionic friction reducing additive;
a polysaccharide; and
a nanomaterial comprising nanoparticles with an average particle size between about 1 nm and about 500 nm;
wherein the slickwater fracturing fluid comprises the nanomaterial in an amount between about 0.1 ppt and about 20 ppt;
wherein the nanomaterial is selected from the group consisting of silica, graphene, aluminum, iron, zirconium, titanium, silicon, zirconium oxide, titanium oxide, silicon oxide, hydroxides, and combinations thereof;

wherein the anionic friction reducing additive is an anionic polyacrylamide friction reducing additive;

wherein the polysaccharide and the anionic friction reducing additive synergistically reduce friction of the slickwater fracturing fluid up to about 70%, as measured by a friction loop with a 0.5 inch-diameter smooth pipe, at a fluid injection rate of 10 gpm, at room temperature (about 22° C.), with two pressure gauges located 2 ft apart measuring friction pressure about once per second so as to increase an injection rate of the slickwater fracturing fluid; and wherein the polysaccharide, the anionic friction reducing additive, and the nanomaterial synergistically provide viscosity to the slickwater fracturing fluid of about 42 cP or less, as measured according to American Petroleum Institute Recommended Practice 13B-2 so as to increase proppant transport capability.

2. The slickwater fracturing fluid of claim 1, wherein the brine comprises reconstituted produced water.

3. The slickwater fracturing fluid of claim 1, wherein the dissolved solids are dissolved in the slickwater fracturing fluid at a concentration between about 9,200 mg/L and about 500,000 mg/L and comprise ions selected from the group consisting of barium, calcium, iron, magnesium, potassium, sodium, strontium, bicarbonate, carbonate, chloride, sulfate, and combinations thereof.

4. The slickwater fracturing fluid of claim 1, wherein the polysaccharide is selected from the group consisting of guar, guar gum, carboxymethylguar, hydroxyethylguar, carboxymethylhydroxyethylguar, hydroxypropylguar, carboxymethylhydroxypropylguar, hydroxyethylcellulose, hydroxypropylcellulose, carboxymethylhydroxyethylcellulose, xanthan, scleroglucan, succinoglycan, diutan, and combinations thereof.

5. The slickwater fracturing fluid of claim 4, wherein the polysaccharide comprises guar and the slickwater fracturing fluid comprises the guar in an amount between about 15 and about 25 pounds guar per 1000 gallons of slickwater fracturing fluid.

6. The slickwater fracturing fluid of claim 1, wherein the nanomaterial is selected from the group consisting of $ZrO_2$, $TiO_2$, $SiO_2$, and combinations thereof.

7. The slickwater fracturing fluid of claim 1, further comprising fresh water.

8. The slickwater fracturing fluid of claim 1, wherein the anionic friction reducing additive and the polysaccharide synergistically invert and hydrate the anionic friction reducing additive to enhance initial friction reduction performance.

9. The slickwater fracturing fluid of claim 1, wherein the polysaccharide, the anionic friction reducing additive, and the nanomaterial synergistically provide viscosity to the slickwater fracturing fluid via intermolecular attractions between the nanoparticles and polymers of the polysaccharide and the anionic friction reducing additive.

10. The slickwater fracturing fluid of claim 1, wherein the slickwater fracturing fluid further comprises a micro-proppant with an average particle size less than about 10 microns to further synergistically increase viscosity of the slickwater fracturing fluid.

11. The slickwater fracturing fluid of claim 10, wherein the slickwater fracturing fluid comprises the micro-proppant in an amount between about 0 and about 1 pounds micro-proppant per gallon of slickwater fracturing fluid.

12. The slickwater fracturing fluid of claim 1, wherein the nanomaterial synergistically increases viscosity of the slickwater fracturing fluid while maintaining friction reduction performance.

13. The slickwater fracturing fluid of claim 1, wherein the slickwater fracturing fluid comprises the anionic friction reducing additive in an amount between about 0.1 and about 10 gpt.

14. The slickwater fracturing fluid of claim 1, wherein the slickwater fracturing fluid comprises the anionic friction reducing additive in an amount between about 2 and about 8 gallons anionic friction reducing additive per 1000 gallons of slickwater fracturing fluid.

15. The slickwater fracturing fluid of claim 1, wherein the slickwater fracturing fluid comprises the polysaccharide in an amount between about 0.1 and about 40 pounds polysaccharide per 1000 gallons of slickwater fracturing fluid.

* * * * *